United States Patent [19]

Mekler

[11] Patent Number: 4,938,108
[45] Date of Patent: Jul. 3, 1990

[54] THEFT-RESISTANT FASTENER SYSTEM
[75] Inventor: Dan Mekler, Jerusalem, Israel
[73] Assignee: Abraham Levy, Tel Aviv, Israel
[21] Appl. No.: 307,314
[22] Filed: Feb. 6, 1989

Related U.S. Application Data

[63] Continuation of Ser. No. 918,605, Oct. 10, 1986, abandoned, which is a continuation of Ser. No. 568,502, Jan. 5, 1984, abandoned.

[30] Foreign Application Priority Data

Jan. 23, 1983 [IL] Israel .................................... 67733

[51] Int. Cl.⁵ ............................................. B25B 13/50
[52] U.S. Cl. ................................. 81/176.15; 81/443;
81/461; 81/176.3
[58] Field of Search ..................... 81/436, 442–444,
81/448–449, 460–461, 176.1–176.3;
411/402–403, 405, 410, 407, 408, 427, 910,
371–373, 396–397; 279/22, 75; 285/277,
314–316, 84, 86; 403/325, DIG. 6

[56] References Cited

U.S. PATENT DOCUMENTS

| | | |
|---|---|---|
| 66,585 | 7/1867 | Harvey . |
| 1,330,098 | 2/1920 | Smith . |
| 2,180,633 | 11/1939 | Holt . |
| 2,770,998 | 11/1956 | Schwartz . |
| 3,094,020 | 6/1963 | Wise . |
| 3,134,291 | 5/1964 | Barry . |
| 3,134,292 | 5/1964 | Walton . |
| 3,302,672 | 2/1967 | Walton . |
| 3,354,756 | 11/1967 | Rusk . |
| 3,362,267 | 1/1968 | Rozmus . |
| 3,411,396 | 11/1968 | Herpich . |
| 3,482,481 | 12/1969 | Newell et al. . |
| 3,693,484 | 9/1972 | Sanderson, Jr. . |
| 3,874,258 | 4/1975 | Semola et al. . |
| 3,902,384 | 9/1975 | Ehrler . |
| 3,906,822 | 9/1975 | Hertelendy et al. . |
| 4,027,572 | 6/1977 | Burge . |
| 4,164,967 | 8/1979 | Breuers . |
| 4,170,918 | 10/1979 | Burge . |
| 4,187,747 | 2/1980 | Pawlow . |
| 4,198,080 | 4/1980 | Carpenter . |
| 4,234,277 | 11/1980 | Benson et al. . |
| 4,356,839 | 11/1982 | Voynovich . |
| 4,466,314 | 8/1984 | Rich . |
| 4,480,514 | 11/1984 | Ponziani . |
| 4,569,259 | 2/1986 | Rubin et al. . |

FOREIGN PATENT DOCUMENTS

| | | |
|---|---|---|
| 881129 | 5/1953 | Fed. Rep. of Germany . |
| 1038363 | 9/1953 | France . |
| 1496246 | 8/1967 | France . |
| 388263 | 2/1933 | United Kingdom . |
| 720486 | 12/1954 | United Kingdom . |
| 1250110 | 10/1971 | United Kingdom . |
| 1481442 | 7/1977 | United Kingdom . |
| 1549321 | 7/1979 | United Kingdom . |
| 1557345 | 12/1979 | United Kingdom . |
| 1558208 | 12/1979 | United Kingdom . |
| 2067115 | 7/1981 | United Kingdom . |
| 2171040 | 8/1986 | United Kingdom . |

Primary Examiner—D. S. Meislin
Attorney, Agent, or Firm—Benoit Law Corporation

[57] ABSTRACT

A theft-resistant fastener system includes a rotatable wrench adapted to engage a head portion of a fastener and to rotate that fastener and head portion about a fastener axis. The wrench and fastener jointly have at least three ball-and-socket joints distributed about the fastener axis. Each of these ball-and-socket joints has a ball in the wrench and a socket in the head portion of the fastener, with each socket being provided with a circular cross-section about a socket axis extending at an acute angle to the fastener axis. The wrench has a releasable actuator for pressing the balls into the sockets preparatory to and during rotation of the wrench about the fastener axis. The head portion of the fastener is prevented from clearing the balls, when the actuator presses these balls into the sockets, by providing that head portion at each socket with an overhang extending over part of the ball in that socket. A need for means for biasing the balls out of the sockets upon release of the actuator is avoided by providing each overhang with an outer limit closer to the fastener axis than a center of a corresponding one of the balls of the ball-and-socket joints. Actuation of the fastener by a conventional wrench is prevented by providing the head portion with outward slopes at the sockets and otherwise about the fastener axis.

16 Claims, 10 Drawing Sheets

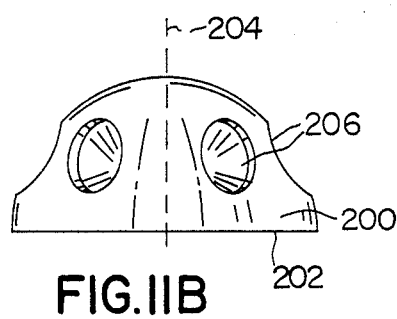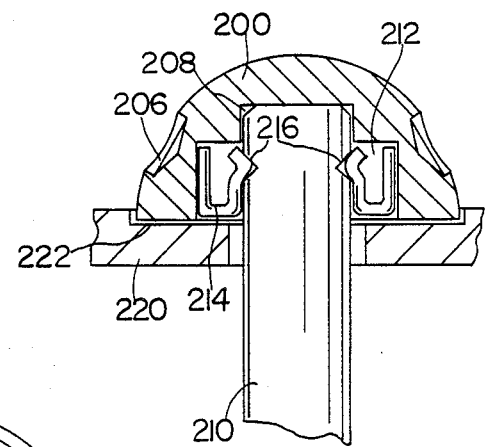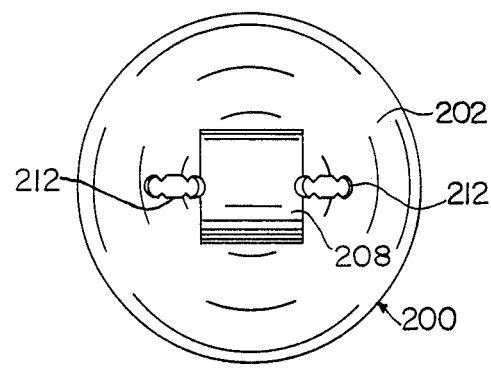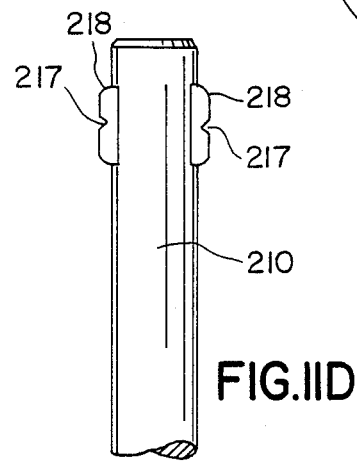
FIG.11B
FIG.11A
FIG.11C
FIG.11D

THEFT-RESISTANT FASTENER SYSTEM

CROSS-REFERENCES

This is a continuation of Patent Application 06/918,605, now abandoned, filed Oct. 10, 1986 for Theft Resistant Fastener and Snap On Wrench For Use Therewith, as a continuation of Patent Application 06/568,502, now abandoned, filed Jan. 5, 1984 for the same subject matter also by the subject inventor.

FIELD OF THE INVENTION

The present invention relates to fasteners, particularly threaded type fasteners, and special tools for insertion and removal thereof, and, more particular, to theft-resistant fastener systems.

BACKGROUND OF THE INVENTION

Various types of theft-resistant fasteners are known from the patent literature and in the marketplace. In fact, since my present system has first become known, there have been those who suddenly saw theft resistance in fasteners which not even their designers had imagined. A case in point is the over hundred-twenty-year old U.S. Pat. No. 66,585, by H. A. Harvey, which issued July 9, 1867 for Improvement In Screws.

In particular, as H. A. Harvey pointed out in that patent, his object was to construct the head of an gimlet-pointed wood screw of a globular or spherical form, and to provide for driving it without cutting the ordinary nick across its face. As further defined in that Patent No. 66,585, the invention disclosed therein consisted in boring holes obliquely into the head, the direction of which shall be at about an angle of forty-five degrees with the shank of the screw, whereby, with a properly constructed screwdriver, the screw may be driven without injury to the head. As confirmed in the further course of that patent, the objective was to make the globular-headed type of screw competitive with the ordinary flat-headed screw, in terms of appearance and durability. In an effort that the screw thus formed may be held, supported, and driven with the greatest facility in all situations, H. A. Harvey also proposed a special screwdriver including jaws in the form of springs in a slide, bearing pins for entering the oblique holes in the screw head.

In similarity to Harvey, O. A. Smith, as apparent from U.S. Pat. No. 1,330,098, issued Feb. 10, 1920, provided lateral recesses in his screw head and a screwdriver having a pair of projections for entering such recesses in driving engagement.

As an aside, British Patent Specification 388,263, by B. Biasi, dated Feb. 23, 1933, proposed an improved coach screw for railroads with a detachable head which, upon removal, left a bare or threaded screw extension.

Of course, there also arose thereafter the familiar Phillips screw head with a crossed pair of partially cut slots, and the corresponding Phillips screwdriver with its point of crossed ridges.

A variant thereof is apparent from U.S. Pat. No. 2,180,633, by C. G. Holt, issued Nov. 21, 1939, for a screw head having four slots arranged in the configuration of the arms of a cross, and for a screw driver having four corresponding downward projections.

A safety against unauthorized removal of screws, nuts and the like has been proposed by N. Kreuz in his German Patent No. 881,129, published May 13, 1953, and in his French Patent No. 1.038.363, published Sept. 28, 1953. The disclosures of those two patents go to great length in devising various designs and configuration in an effort to thwart any conceivable attempt by unauthorized persons to loosen the fastener. Even an irregular pattern of holes is proposed for receiving a corresponding irregular pattern of pins of a driver that would only be possessed by authorized personnel. However, despite all these efforts, it would appear that a standard tool, such as a good pair of nose pliers, would do for loosening those fasteners, since all that would be necessary is an insertion of as little as one pair of pins or tips into a single pair of opposite holes, and a rotation of such inserted pins or tips about the axis of the fastener, for a loosening of such fastener.

U.S. Pat. No. 2,770,998, by R. F. Schwartz, issued Nov. 20, 1956, discloses a tamper-proof screw having a frusto-conical head with flat tool engaging facets thereon. Again, an approach completely different from Harvey.

The same applies to the disclosure of U.S. Pat. No. 3,134,291, by J. K. Barry, issued May 26, 1964, for Non-Removable Screw. As that title implies, the disadvantage of that approach is that there is no authorized tool for removing the screw according to that patent disclosure. Rather, even an authorized person would have to use the same crude approach as a burglar in order to remove any screw according to that patent.

The same applies to the disclosures of U.S. Pat. Nos. 3,134,292 and 3,302,672, by M. Walton, issued May 26, 1964 and Feb. 7, 1967, respectively, for an irretrievable screw, also known as "one-way screw" and for a screw-driving tool therefor. While such screws are used in great numbers, their problem is, of course, that they have to be destroyed for access to the fastened object, even by authorized personnel.

U.S. Pat. No. 3,411,396, by W. M. Herpich, issued Nov. 19, 1968, for a screw head with inclined driving recesses, for enabling greater driving or tightening torque than removal torque. However, since that patent does not disclose a special tool for removing the screw, it is believed that a screw with that disclosed screw head could still be removed with an ordinary bladed screwdriver.

Somewhat better in this respect is the bolt or nut head disclosed in U.S. Pat. 3,482,481, by S. Newell et al, issued Dec. 9, 1969, since it has an inclined outer surface that resists the application of regular fork or crescent wrenches. However, that bolt or nut head is provided with so many grooves and ridges at the outside thereof, that it still could be gripped and rotated by a pipe wrench of a hardness greater than that of the bolt or nut head, even if the grooves and ridges are included as disclosed in that patent.

The disclosure of British Patent Specification 1 250 110, by H. Hart, published Oct. 20, 1971, expands upon the Kreuz concept set forth above, but it again appears that all that is necessary to undo the fastener is engagement thereof at the two diametrically opposite holes 9 in the diametrical plane A. It would thus appear that the conical fastener could be loosened with simple nose pliers or with another implement having two projecting tips or pins of the type of the two diametrically opposed pins 8 shown in that British patent specification.

It may be for that reason that the subsequent U.S. Pat. No. 3,874,258, by Y. J. Semola et al, issued Apr. 1, 1975, provides the fastener with arcuate lobes in coded configurations, in order to prevent the theft of automobile wheels and tires.

U.S. Pat. No. 4,027,572, by W. G. Burge, issued June 7, 1977, provides for a loosely fitting, inner flanged sleeve in order to prevent removal of its theft-prevention nut by the use of an ordinary pipe wrench. However, that apparently did not solve the problem either, as apparent from the first paragraph of the subsequent U.S. Pat. No. 4,170,918, issued Oct. 16, 1979, also to W. G. Burge. Thus, British Patent Specification No. 1 481 442, by Amerace Corporation, published July 27, 1977, correctly comments that the majority of special wrenching configurations are susceptible to tampering with common tools, such as vise grip pliers, etc. However, it is not seen why the nut and bolt head configurations disclosed in that patent specification could not also be gripped at their lateral notches by vise grip pliers of sufficient hardness and could thus be tampered with as well.

The locking device for a nut of British Patent Specification No. 1 549 321, by Shur-Lok International S.A., published July 25, 1979 is capable of locking the nut against rotation relative to a threaded shaft or other member. However, that patent specification does not disclose any theft-resistant fastener device, since that locking device can be removed by means of a hub remover or other conventional tool.

As if to confirm the fallacy of the above mentioned Kreuz and Hart approaches, U.S. Pat. No. 4,164,967, by K. K. Breuers, issued Aug. 21, 1979, limits itself to two actuation holes arranged at different sides of the screw axis and engageable by the tips of a nose plier or by the special screwdriver disclosed therein.

U.S. Pat. No. 4,356,839, by A. Voynovich, issued Nov. 2, 1982, for tamper resistant valve actuator for fire hydrant, provides such actuator with a bullet-shaped nose having typically three regularly or irregularly spaced shallow indentations or recesses, being preferably teardrop shaped to prevent actuation by a chisel or similar implement. That patent also discloses the manual actuating means in the form of a wrench comprising three threaded studs or set screws that provide cone points for engaging the bullet-shaped actuator for rotation thereof. Hopefully this will work well in the midst of a conflagration, where instantaneous actuation of the fire hydrant for undelayed supply of water is mandatory.

What actually is needed is a nonslip torquing system, as recognized in U.S. Pat. No. 4,466,314, by R. L. Rich, issued Aug. 21, 1984. However, in order to achieve the requisite torquing with essentially axial pins or projections, that system also requires an internal thread in the fastener and an external thread in the torquing tool, which can be a problem in terms of expense, alignment and ease of operation.

U.S. Pat. No. 4,480,514, by L. F. Ponziani, issued Nov. 6, 1984, for Driving Tool for Tamper Resistant Screw, provides the screw head with slots that can easily be engaged by an ordinary chisel or similar tool.

U.S. Pat. No. 4,569,295, by S. R. Rubin et al, issued Feb. 11, 1986, for Automobile Wheel Cover Locking Bolt and Wrench Combination relates how the wrench of prior-art fasteners had a tendency to slip out of alignment with the fastener head, which was very frustrating, especially where the tool had to be used in poor illumination or in busy environments. Accordingly, that patent suggests provision of a coaxial recess in the fastener for receiving a corresponding guide at the bottom of the wrench socket. This, of course, weakens the fastener or at least requires a larger diameter thereof, than without the requisite central recess. The fastener system according to that patent, as well as according to its illustrated prior-art example, also has mating coded key elements and lock impressions for security reasons. It would appear, however, that the illustrated prior-art fastener head and the fastener head newly proposed in that patent could be engaged and rotated by a pipe wrench or similar conventional tool, unless a recess were provided around the fastener as in some of the above mentioned prior-art proposals.

The same appears to apply to the fastener system of French Patent No. 1.496.246, issued Aug. 21, 1967 to Ateliers de Construction de Rüti S.A., disclosing a fastener with undercut wrench engaging notches.

Out of frustration with this prior-art background, the question has been raised, rather surprisingly, whether the unrelated development of ball-and-socket wrenches could have brought relief. For instance, the relatively early British Patent Specification No. 720,486, by Moore & Wright (Sheffield) Limited, inventor Norman Holley, published Dec. 22, 1954, proposes improvements in ratchet-operated mechanical screwdrivers wherein balls around a grooved spindle are selectively engaged and disengaged by lugs of a ball retaining ring. Of course, there would be nothing to prevent the spindle from being rotated by an ordinary pipe wrench or other conventional tool, if that spindle were seen as a fastener removed from the ratchet structure.

The bolt holding tool disclosed in U.S. Pat. No. 3,094,020, by C. J. Wise, issued June 18, 1963, may be used to prevent a bolt from turning while applying or removing a nut thereon. However, the nut disclosed in that patent is still removeable by a conventional fork or crescent wrench.

U.S. Pat. No. 3,354,756, by G. R. Rusk, issued Nov. 28, 1967, discloses a wrench for removing guide pins that have become frozen into core boxes. However, that would make the guide pins simply harder to remove, but not actually theft resistant in the ordinary sense.

U.S. Pat. No. 3,362,267, by W. J. Rozmus, issued Jan. 9, 1968, discloses a roller ratchet wrench that has certain advantages over pawl type wrenches. However, fasteners mentioned or alluded to in that patent are removeable by conventional wrench sockets or other familiar tools.

The same applies to the system of U.S. Pat. No. 3,693,484, by G. H. Sanderson, Jr., issued Sept. 26, 1972, for a snap-on spanner wrench, in which balls are actuated radially inwardly into a continuous annular groove in a cylindrical nipple. In addition to the fact that there is nothing to prevent that nipple to be rotated with a pipe wrench or other conventional tool, it is also a fact that there is nothing in that nipple to prevent the balls from rotating thereabout. To the contrary, an additional pair of axial pins and corresponding axial holes in the corresponding flat end face around the nipple are required to enable the wrench to transmit any rotational power at all.

The ratchet wrenches of U.S. Pat. No. 3,906,822, by Hertelendy et al, issued Sept. 23, 1975, use engaging balls and similar members, to actuate fasteners which, however, can be operated by conventional tools as well, and which are not theft resistant in any sense of the word.

A subsequently disclosed chuck according to British Patent Specification No. 1 557 345, by Kajetan Leitner, published Dec. 5, 1979, cleverly uses the circumferentially distributed balls for gripping the head of a screw or other component during rotative manipulation thereof. However, those balls again are incapable of preventing rotation of the screw or other fastener. Also, there is no theft resistance either, since the screw thus driven can be removed with an ordinary screwdriver.

British Patent Specification No. 1 558 208, by Rubery Owen Conveyancer Limited, published Dec. 19, 1979, prevents inadvertent disconnection of a bayonet type connector. However, as that patent specification discloses in its fourth column, the connection is still releasable with the aid of a small Allen key, and is thus not theft-resistant either.

Somewhat closer to the action appears the internal pipe wrench according to U.S. Pat. No. 3,902,384, by F. O. Ehrler, issued Sept. 2, 1975, since it at least could be argued that the threaded broken-off piece of pipe disclosed therein resists removal from the intact piece of pipe in which it is stuck. In an attempt to remove such piece of pipe, that patent proposes driving circumferentially distributed balls with the aid of a cone radially into the inner wall of that piece of pipe. Of course, since the balls thereby expand the wall of the broken-off piece of pipe into the internally threaded portion of the intact piece of pipe, it is not seen how the desired removal could be easy. Indeed, the disclosure of that patent suggests a type of rocking action in an attempt to loosen "troublesome connections." Besides, there is no way for the balls to drive the externally threaded piece of pipe into the internally threaded bore, and that patented tool would obviously be useless for fastener setting purposes.

The quick-release mechanism for the socket wrench of U.S. Pat. No. 4,187,747, by R. E. Pawlow, issued Feb. 12, 1980, provides a socket-engaging ball and a manually operable actuator therefor, but is not capable of preventing any fastener therein mentioned from being releasable by any conventional wrench.

U.S. Pat. No. 4,198,080, by W. L. Carpenter, issued Apr. 15, 1980, discloses a telescoping-type connector for fluid lines, comprising an inner coupling member having a circumferential groove preceded by circumferentially distributed recesses, and an outer coupling member having circumferentially distributed balls for engaging the inner member at the circumferential groove. According to the disclosure of that patent, every effort is made to prevent the balls from engaging the inner coupling member at the circumferentially distributed grooves. In consequence, that system would appear to be useless for fastener rotation purposes.

U.S. Pat. No. 4,234,277, by Benson et al, was issued Nov. 18, 1980, for Motor Quick-Change Chuck System for Tool Having Cylindrically Shaped Adapter Portion. This is exactly what it says and has nothing to do with theft-resistance fasteners, or any other fasteners for that matter. Accordingly, while that chuck employs typically three balls for engaging corresponding spherically shaped dimples in a cylindrical adaptor portion, such adaptor portion, with its radially outwardly facing dimples, would in no way be protected against rotation and removal by a pipe wrench or similar conventional tool, if such adaptor portion were supposed to be a fastener, or the head of a fastener, by any uncontrolled stretch of the imagination.

By contrast, the stud driving or extracting apparatus according to British Patent Application 2 067 115, by G. Rothenberger, published July 22, 1981, at least could arguably be said to be useful in removing studs that resist extraction. However, while a clever combination of rollers and ramps are provided for that purpose, there obviously is nothing that would prevent a stuck stud to be pulled by a strong pair of pliers or other extracting means.

It can thus be seen that the prior art which has been brought into the picture after my subject invention had been disclosed was as ineffective to bring a solution as the more relevant prior art actually concerned with theft-resistant systems.

SUMMARY OF THE INVENTION

It is a general aspect of this invention to overcome the disadvantages and to meet the needs expressed or implicit in the above background or in other parts hereof.

It is a germane object of this invention to provide improved theft-resistant fastener systems wherein the fastener can be removed non-destructively with an authorized wrench, but will resist removal by intruders and other unauthorized persons to a very high degree.

It is a related aspect of this invention to create a method of providing an improved theft-resistant fastener system.

In this connection, it is also an object of this invention to provide a theft-resistant fastener system in which the fastener can be tightened with as much of the torque as specified for a given application, such as assembly or otherwise, and can be loosened with an authorized wrench by as much torque as necessary to remove a stuck fastener without damage.

It is also an object of this invention to provide a theft-resistant fastener system suited to automatic and robot-assisted assembly, and to other high-speed large-scale assembly.

It is a related object of this invention to provide a theft-resistant fastener system in which the wrench is self-centering on the fastener, and in which the fastener cannot accidentally drop out of the wrench.

It is also an object of this invention to provide a theft-resistant fastener system in which fasteners can be safely manipulated into, or removed from, hard-to-get-at positions and locations, including upward and downward, and through narrow passages, etc.

Nevertheless, it is also an object of this invention to provide the fastener of a theft-resistant system with a pleasant and decorative appearance that gives an aesthetic look to furniture, household utensils, airplanes, buses, and other technological or industrial products and apparatus.

It is also an object of this invention to provide a theft-resistant fastener sYstem in which the fastener performs the function of a lock on doors, electric switches, hydraulic valves, regulators and couplings of various sorts, and in many other applications.

Other objects of the invention will become apparent in the further course of this disclosure.

The subject invention resides in a method of providing a theft-resistant fastener system including a rotatable wrench adapted to engage a head portion of a fastener and to rotate that fastener and head portion about a fastener axis, and, more specifically, resides in the improvement comprising in combination the steps of providing the wrench and fastener jointly with at least three ball-and-socket joints distributed about the fastener axis, including providing each of these ball-and-socket joints with a ball in the wrench and a socket in the head portion of the fastener, each socket being provided with a circular cross-section about a socket axis extending at an acute angle to the fastener axis, providing the wrench with a releasable actuator for pressing the balls into the sockets preparatory to and during rotation of the wrench about the fastener axis, preventing the head portion from clearing the balls, when said actuator presses these balls into their sockets, by providing the head portion at each socket with an overhang extending over part of the ball in that socket, avoiding a need for means for biasing the balls out of the sockets upon release of the actuator by providing each overhang with an outer limit closer to the fastener axis than a center of a corresponding one of the balls of the ball-and-socket joints; and preventing actuation of the fastener by a conventional wrench by providing the head portion with outward slopes or a sloped outer surface at the sockets about the fastener axis.

The subject invention also resides in a theft-resistant fastener system including a rotatable wrench adapted to engage a head portion of a fastener and to rotate that fastener and head portion about a fastener axis, and made by the method just defined or by any other method according to my subject invention herein disclosed.

The subject invention further resides in a theft-resistant fastener system comprising, in combination, a fastener with a head portion having a sloped outer surface about a fastener axis, a rotatable wrench adapted to engage a head portion of that fastener and to rotate that fastener and head portion about the fastener axis, wrench and fastener jointly comprising at least three ball-and-socket joints distributed about the fastener axis, each of these ball-and-socket joints having an unbiased ball in the wrench and a socket in the sloped outer surface of the head portion of the fastener so as to prevent actuation of the fastener by a conventional wrench, and each socket having a circular cross-section about a socket axis extending at an acute angle to the fastener axis, the wrench including a releasable actuator means for pressing the balls into their sockets preparatory to and during rotation of the wrench about the fastener axis, and the fastener including means for preventing the head portion from clearing the balls, when the wrench presses the balls into their sockets, including in the head portion, at each socket, an overhang extending over part of the ball in that socket, each overhang having an outer limit closer to the fastener axis than a center of a corresponding one of the balls of the ball-and-socket joints.

The subject invention also resides in a fastener for a theft resistant fastener system including a rotatable wrench having a releasable actuator enabling said wrench to engage a head portion of the fastener and to rotate that fastener and head portion about a fastener axis, and, more specifically, resides in the improvement comprising, in combination, the head portion of the fastener having a sloped outer surface about said fastener axis so as to prevent actuation of the fastener by a conventional wrench at least three sockets distributed in the sloped outer surface of the fastener head portion about the fastener axis for receiving a corresponding number of balls from the wrench in a ball-and-socket arrangement, each socket having a circular cross-section about a socket axis extending at an acute angle to the fastener axis, and means for preventing the head portion from clearing the balls, when the actuator presses the balls into the sockets, including in the head portion, at each socket, an overhang extending over part of the ball in that socket, each overhang having an outer limit closer to the fastener axis than a center of a corresponding one of the balls of the ball-and-socket joints.

The subject invention further resides in a rotatable wrench for a theft-resistant fastener system including a fastener having a head portion engageable by that rotatable wrench for rotation about a wrench axis, and, more specifically resides in the improvement comprising, in combination, at least three balls unbiased a corresponding number of sockets in the wrench disposed in wherein each socket has a circular cross-section about a socket axis extending at an acute angle to the wrench axis, and a releasable actuator means for pressing the balls partially out of the sockets preparatory to and during rotation of the wrench about the wrench axis.

Pursuant to an embodiment of the present invention, there is provided a fastener comprising a shaft portion having a configuration adapted for rotational engagement with a mating element and an engagement portion having a plurality of sockets formed therein adapted for engagement by retaining elements associated with a wrench element. According to one embodiment of the invention, the engagement portion is integrally formed with the element, as in a threaded fastener.

According to another embodiment of the invention, the engagement portion is a removable cap member adapted for selective retention on the shaft to be operated. Additionally in accordance with a preferred embodiment of the present invention, the engagement portion is formed with a plurality of sockets of generally circular cross section and oriented at an acute angle relative to a plane perpendicular to the longitudinal axis of the shaft portion.

According to a preferred embodiment of the present invention, the fastener has a semispherical engagement portion and is provided with sockets arranged in a single plane, typically oriented about 60 degrees downwards from the longitudinal axis of the fastener. Alternatively, the sockets may be arranged in various planes, have differing separations therebetween and may be of different sizes. The orientation of the sockets may thus define a theft resistant code and require a similarly coded wrench to disengage the fastener.

There is further provided in accordance with an embodiment of the present invention a removable cap member adapted for selective retention on a shaft, the cap member having a plurality of sockets formed therein adapted for engagement by retaining elements associated with an operating handle. Additionally in accordance with a preferred embodiment of the present invention, the cap member is formed with a plurality of sockets of generally circular cross section and oriented at an acute angle relative to a plane perpendicular to the longitudinal axis of the shaft.

According to a preferred embodiment of the present invention, the cap member defines a shaft engaging recess and has a semispherical head which is provided with sockets arranged in a single plane, typically oriented about 60 degrees downwards from the longitudinal axis of the shaft receiving bore. Alternatively, the sockets may be arranged in various planes, have differing separations therebetween and may be of different sizes. The orientation of the sockets may thus define a theft resistant code and require a similarly coded operating handle to disengage the cap member.

Additionally in accordance with an embodiment of the present invention there is provided a wrench element for use with elements having engagement portions on which are defined a plurality of sockets, the wrench element including a base, a plurality of retaining elements retained in the base and oriented to correspond to the distribution of sockets on the engagement portion, and retaining element orienting apparatus operative in a first position to allow the retaining elements to be oriented in a retracted position whereby ready engagement and disengagement of the engagement member therewith is permitted and in a second position to secure the retaining elements in an engagement position wherein engagement of the retaining elements in the sockets prevents separation of the engagement portion from the wrench and relative rotation therebetween.

According to one embodiment of the invention, the orienting apparatus comprises a sleeve which moves axially with respect to the longitudinal axis of a fastener from the first position to the second position. Alternatively, the orienting apparatus comprises a sleeve which moves rotationally from the first position to the second position.

In accordance with another embodiment of the present invention, the base includes a reciprocatable displacement member which activates the retaining element orienting apparatus.

Additionally according to an embodiment of the present invention, there is provided a lockable latch mechanism comprising a latch, a fastener shaft adapted to be rotated to open or close the latch; a removable cap member defining a plurality of sockets adapted for selective retention on the fastener shaft, a selectively removable operating handle including a wrench element which includes a base, a plurality of retaining elements retained in the base and oriented to correspond to the distribution of sockets on the cap member, and retaining element orienting apparatus operative in a first position to allow the retaining elements to be oriented in a retracted position whereby ready engagement and disengagement of the cap portion therewith is permitted and in a second position to secure the retaining elements in an engagement position wherein engagement of the retaining elements in the sockets prevents separation of the cap member from the handle and relative rotation therebetween; the latch being locked in the first, disengaged orientation.

It is a particular feature of the invention that engagement between the fastener and the wrench element is not entirely rigid and permits a limited amount of play, which enables ease of fine alignment which is required for efficient fastener attachment.

BRIEF DESCRIPTION OF THE DRAWINGS

The present invention will be morefully understood and appreciated from the following detailed description taken in conjunction with the drawings in which:

FIG. 11A illustrates a removable cap member in engagement with an associated fastener constructed and operative in accordance with an embodiment of the invention;

FIGS. 11B and 11C illustrate respective side and bottom view illustrations of the cap member of FIG. 11A; and FIG. 11D is a side view illustration of a cylindrical shaft adapted for engagement with a removable cap member in accordance with an alternate embodiment of the present invention.

DESCRIPTION OF PREFERRED EMBODIMENTS

Figure 4:
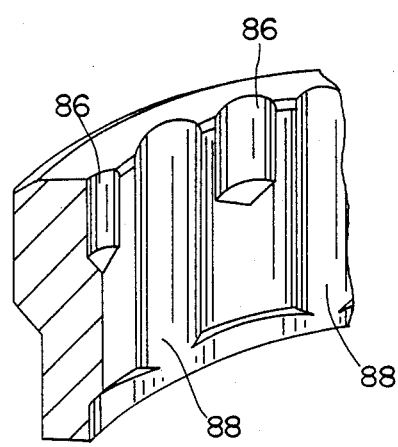
FIG. 4 is a pictorial illustration of a portion of a sleeve employed in the embodiment of FIGS. 3A and 3B.

As seen in the drawings, the subject invention provides a theft-resistant fastener system including a rotatable wrench adapted to engage a head portion 16, 91, 142, 180, 200 of a fastener and to rotate that fastener and head portion about a fastener axis 12. The expression "fastener" is employed rather broadly in this context, as it may cover not only nuts and bolts, but also special door knobs and other security devices, such as more fully disclosed below. Also the expression "theft-resistant" is not limited in its significance to the fastener itself, but may for instance, extend to the contents of any thing secured against unauthorized access by the fastener, special door knob, and the like.

My invention provides the wrench and fastener jointly with at least three ball-and-socket joints distributed about the axis 12 and includes providing each of these ball-and-socket joints with a ball 60, 140, 168 in the wrench and a socket 20, 146, 163, 206 in the head portion of the fastener, each socket being provided with a circular cross-section about a socket axis extending at an acute angle to the fastener axis 12.

My invention also provides the wrench with a releasable actuator 70, 94, 96, 98, 122, 170 for pressing the balls 60, 140, 168 into the sockets 20, 146, 163 preparatory to and during rotation of the wrench about the fastener axis 12.

My invention further prevents the fastener head portion 16, 91, 142, 180, 200 from clearing the balls 60, 140, 168, when the actuator 70, 94, 96, 98, 122, 170 presses these balls into the sockets, by providing that head portion at each socket with an overhang 84, 148, 165 extending over part of the ball in that socket 20, 146, 163, 206.

My invention also avoids any prior-art need for means for biasing the balls out of the sockets upon release of the actuator 70, 94, 96, 98, 122, 170. My invention avoids that need by providing each overhang 84, 148, 165 with an outer limit closer to the fastener axis 12 than a center of a corresponding one of the balls 60, 140, 168 of the ball-and-socket joints. This, finally, does away with what prevented the above mentioned Harvey device (U.S. Pat. No. 66,585) from becoming a workable high-torque tool. In particular, Harvey needed his spring jaws b to make his tool workable. However, such jaws became easily bent and twisted under torque loads. Yet, bias springs were still proposed over eighty years later, as may be seen from the above mentioned British Patent Specification No. 720,486 by Moore & Wright (Sheffield).

Actuation of the fastener by a conventional wrench is prevented by providing the fastener head portion 16, 91, 142, 180, 200 with outward slopes at the sockets and otherwise about the fastener axis 12.

My invention provides my wrench and fastener jointly with at least three ball-and-socket joints distributed about said axis, each of these ball-and-socket joints having an unbiased ball 60, 140, 168 in the wrench and a socket 20, 146, 163, 206 in the head portion of the fastener, and each socket having a circular cross-section about a socket axis extending at an acute angle to the fastener axis 12. In this manner, my invention avoids the drawbacks of those above mentioned prior-art devices in which the "security" fastener could be removed with a nose plier or similar conventional tool. According to a preferred embodiment, the acute angle substantially is 60° relative to the fastener axis 12, as seen from the applied wrench.

Figure 8:
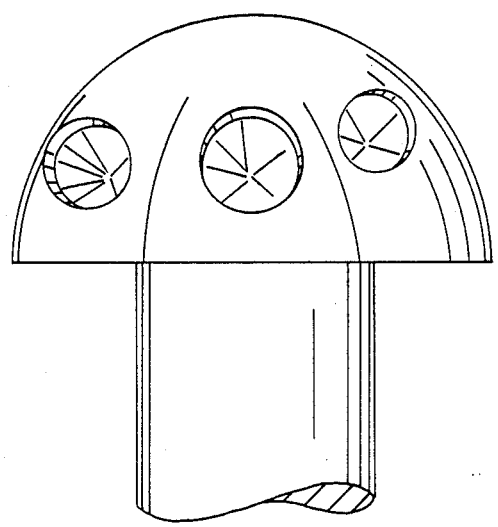
FIG. 8 illustrates an alternative fastener socket configuration.

In furtherance of the theft or access resistant aspect of my invention, an embodiment thereof restricts removal of the fastener to a specifically authorized wrench by distributing said ball-and-socket joints irregularly about said fastener axis, as, for instance, shown in FIG. 8 and more fully described below. Alternatively or additionally, an embodiment of my invention restricts removal of the fastener to a specifically authorized wrench by varying the sockets in size about the fastener axis 12, as also shown in FIG. 8 and more fully described below. Also alternatively or additionally, an embodiment of my invention restricts removal of the fastener to a specifically authorized wrench by arranging the sockets in different planes extending perpendicularly to said fastener axis 12, as also apparent from FIG. 8 and more fully described below.

It may be noted that the overhangs 84, 148, 165 extending over part of the ball in each socket actually constitute a means for preventing the fastener head portion from clearing the balls 60, 140, 168, when the wrench presses these balls into the fastener sockets.

Figure 1:
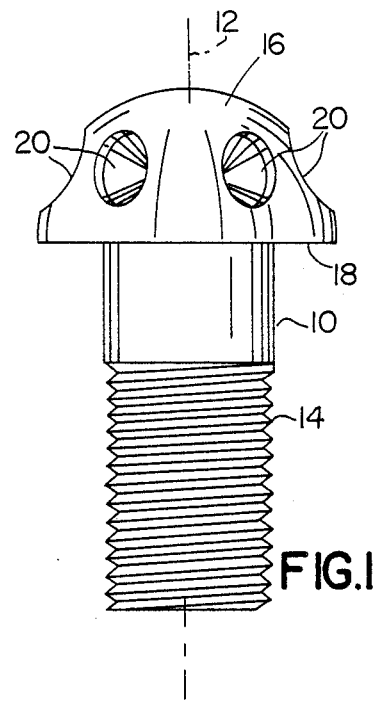
FIG. 1 is a fastener constructed and operative in accordance with an embodiment of the present invention.

Reference is now made to FIG. 1 which illustrates a fastener constructed and operative in accordance with a preferred embodiment of the present invention. The fastener comprises a shaft portion 10, which extends along a longitudinal axis 12 and is typically formed at the lower end thereof with a desired type of threading 14. Integrally formed with shaft portion 10 is a head portion 16. According to a preferred embodiment of the present invention, head portion 16 is of overall semispherical configuration defining a disk surface 18 which lies in a plane extending perpendicular to longitudinal axis 12.

A plurality of sockets 20, in the form of recesses having preferably a circular cross section are arranged in the spherical surface of the head portion 16. Preferably, the sockets 20 are evenly distributed on the spherical surface and lie in a plane parallel to the plane at disk surface 18. According to a preferred embodiment of the invention, the centers of the sockets are oriented at an angle of approximately 60° downwards with respect to the longitudinal axis of the fastener. In other words, the axes of symmetry of the sockets, taken through their respective centers at the surface of the head portion, are oriented at an angle of approximately 60° with respect to an imaginary projection through the head portion, of the longitudinal axis of the shaft portion.

It is appreciated that any desired number of sockets may be employed, although six are preferred in the illustrated embodiment. The size of the fastener and of the head portion as well as of the sockets may also be selected as appropriate. It is also appreciated that the overall configuration of the fastener and its head portion may be selected as appropriate.

For convenience, reference is made throughout the specification and claims to a fastener. However, it is appreciated that any other element having a shaft arranged for axial rotation may be configured with sockets and a head portion of the general type described herein and used with the operating handles to be described hereinbelow. The invention is thus not limited to fasteners, but extends to other types of elements having other or additional functions which render the positive non-rotational engagement provided by the invention useful.

Figure 2A:
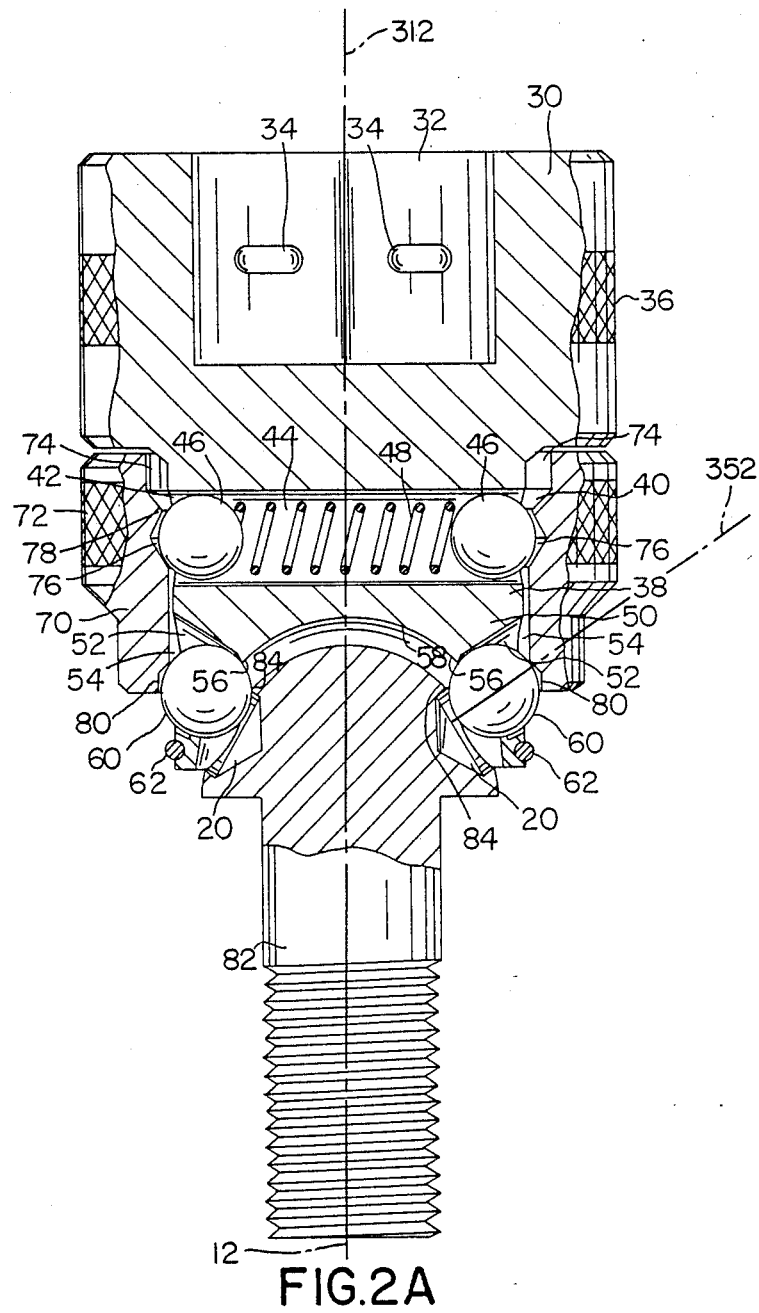
FIGS. 2A and 2B are illustrations, in partially cut away form, of a wrench element and associated fastener constructed and operative in accordance with a preferred embodiment of the invention in respective disengaged and engaged orientations.
Figure 2B:
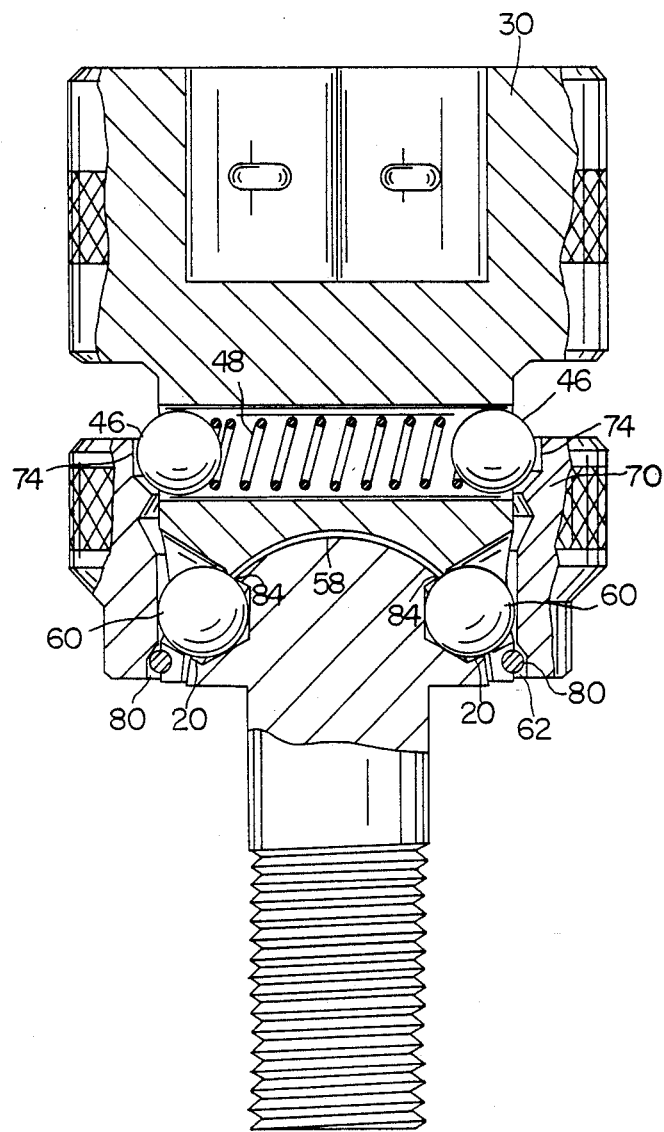

Reference is now made to FIGS. 2A and 2B which illustrate a wrench element constructed and operative in accordance with an embodiment of the present invention in association with the fastener of FIG. 1. The wrench element comprises a base 30 which is generally configured as a surface of rotation and is formed with a socket 32 at a first butt end surface thereof for receiving a square head of a conventional standard universal wrench driver, such as a ratchet wrench of conventional construction. Socket 32 is formed with transverse recesses 34 in the walls thereof for accommodating spring loaded balls associated with conventional square heads, which are provided to retain the heads in engagement with the sockets. Alternatively to the provision of socket 32 there may be provided any other type of wrench attachment means or alternatively a wrench handle fixedly attached to base 30 or integrally formed therewith. The portion of base 30 in which socket 32 is defined is typically formed with a conditioned peripheral surface 36 for enhancing the ease of gripping thereof. This portion of base 30, which is of relatively large diameter, will hereinafter be referred to as the grip portion.

Adjacent the grip portion there is an intermediate portion 38 of lesser diameter than the grip portion. Formed in intermediate portion 38 is a channel 44 formed with apertures 40 and 42. A spring 48 is disposed in channel 44 and is operative to urge balls 46 towards the apertures 40 and 42. It is appreciated that the spring loaded balls 46 operate to selectably retain a sleeve member in one of two selectable positions, as will be described hereinbelow.

Adjacent intermediate portion 38 of base 30 there is provided a socket defining portion 50 having formed therein a plurality of sockets 52, each defined by a first, large aperture 54 on the radially outer surface of portion 50 and a second smaller aperture 56 on an inner facing surface 58 of portion 50. As seen in FIGS. 2A, 2B, 3A, 3B, 5, 6, 9A, 9B, and 10A, each wrench socket 52 extends at an acute angle to the fastener axis 12 which is also the axis of rotation of the wrench or the wrench axis 312. The acute angle of these ball retaining sockets 52 or of their socket axis 352 may be the same as the acute angle of the fastener sockets 20, such as substantially 60° to the axis 12. A ball 60 is disposed in each of sockets 52 and is sized such as to be able to enter through aperture 54 but as to be prevented from passing through aperture 56. A ring 62 is disposed about the bottom edge of portion 50 for defining a stop for axial movement of a sleeve described below.

It may be appreciated that balls 60 may assume a range of positions extending from a full inward position at which they extend a maximum amount through apertures 56 to a fully retracted position in sockets 52.

It may be appreciated that the construction described so far is common to both embodiments illustrated in FIGS. 2A, 2B and 3A, 3B. The structure thus described is indicated by the above reference numerals in both embodiments, for purposes of clarity.

In the embodiment of FIGS. 2A and 2B, there is provided an axially slidable sleeve 70 having a splined or otherwise conditioned gripping surface 72 formed on the outer cylindrical surface thereof and a pair of inner annular shaped recesses 74 and 76, separated by a ring protrusion 78. Sleeve 70 is also formed with a edge shoulder recess 80.

The operation of the apparatus of FIGS. 2A and 2B will now be described briefly. As seen in FIG. 2A, when the sleeve 70 is in its retracted orientation, in abutting relationship to the grip portion of the base 30, balls 46 seat in recess 76 and thus retain the sleeve 70 in its retracted orientation. In this orientation, balls 60 are partially seated in shoulder recess 80 and thus are not pressed to their full inward position. As a result of the freedom of balls 60 in sockets 52, an element, such as fastener 82 having a plurality of sockets 20 may be readily engaged and disengaged from the base 30, since edges 84 of sockets 20 can clear the balls 60.

Turning now to FIG. 2B, which illustrates an engaged orientation of the wrench element, it is seen that the sleeve 70 is in an extended orientation having slid axially relative to base 30 such that balls 46 are seated in recess 74, thus retaining sleeve 70 in its extended orientation. In this orientation sleeve 70 engages balls 60 upwardly of recess 80 and thus forces balls 60 into their full inward position. When the balls 60 are in this position, it can be seen that edges 84 of sockets 20 cannot clear the balls and thus the head portion of the fastener is securely retained against surface 58. It is also appreciated that rotation of the head portion of the fastener with respect to base 30 is impossible, due to the discrete, non-continuous configuration of the sockets 20 in the head portion.

Shifting of the sleeve from its extended orientation to its retracted orientation and vice versa is accomplished by axial movement of the sleeve against the spring loaded yieldable force of balls 46.

Figure 3A:
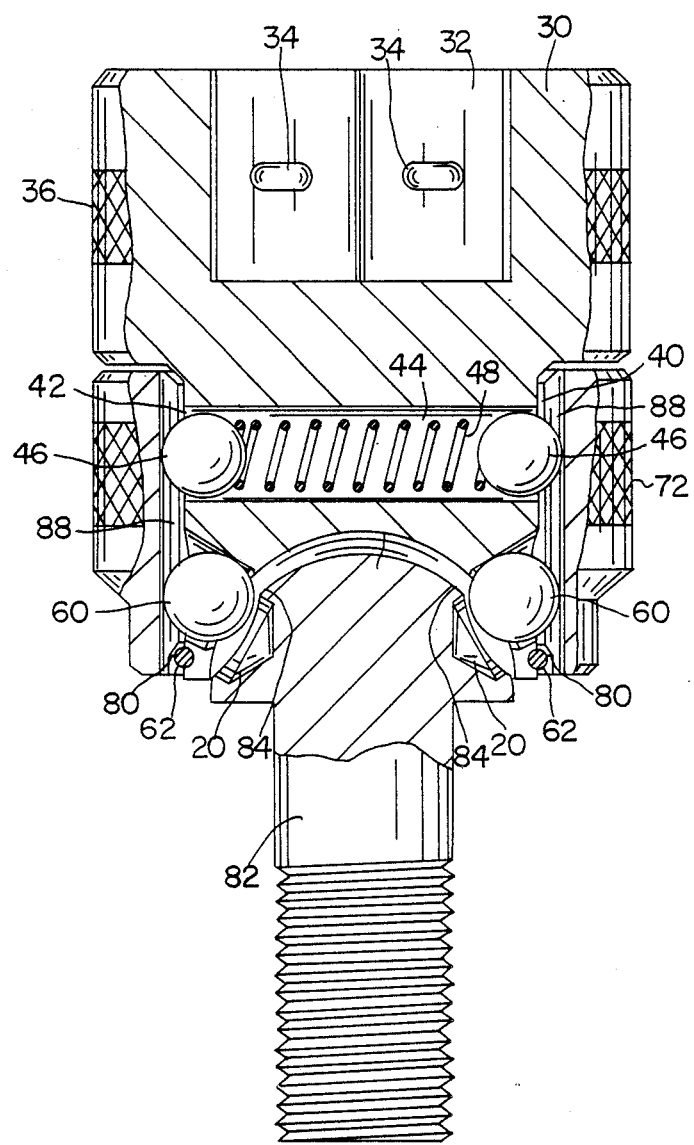
FIGS. 3A and 3B are illustrations, in partially cut away form, of a wrench element and associated fastener constructed and operative in accordance with another preferred embodiment of the invention in respective disengaged and engaged orientations.
Figure 3B:
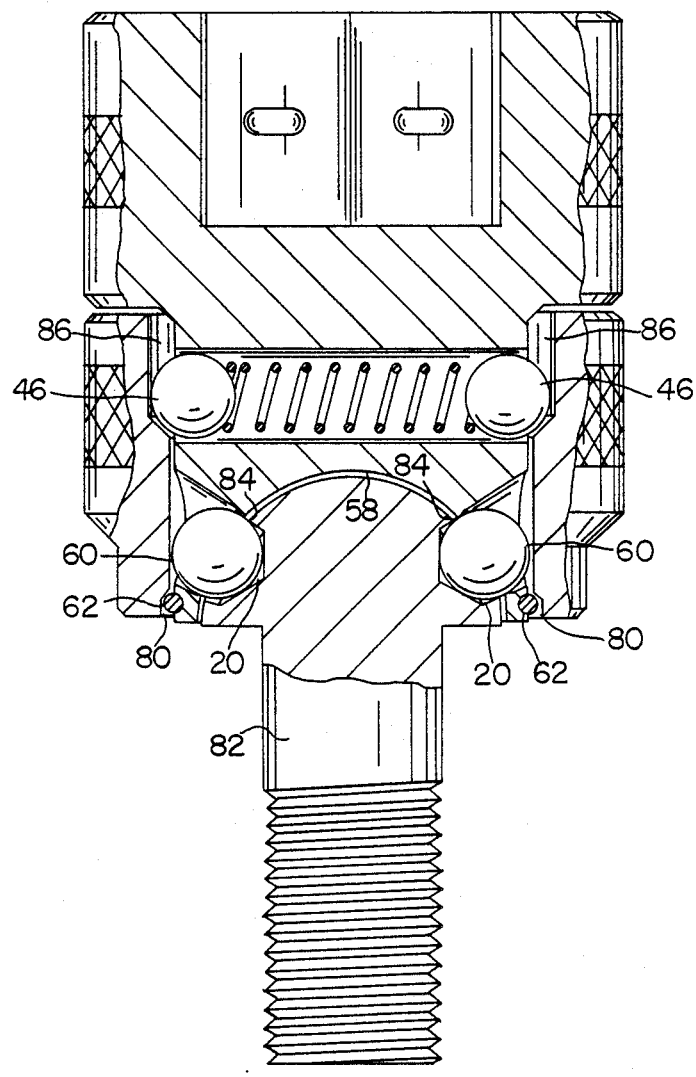

Reference is now made to FIGS. 3A and 3B which illustrate an alternative embodiment of a wrench element. As noted above, the base construction is identical in the two embodiments and is indicated by identical reference numerals. For the sake of conciseness, the description of this portion will not be repeated.

In contrast to the embodiment of FIGS. 2A and 2B wherein the engagement status of the wrench element is determined by the axial disposition of the sleeve relative to the base, in the embodiment of FIGS. 3A and 3B, the engagement status of the wrench element is determined by the azimuthal disposition of the sleeve relative to the base. In this connection, reference is made particularly to FIG. 4 which illustrates a portion of the sleeve employed in the embodiment of FIGS. 3A and 3B. It is seen that the sleeve is formed with alternating half length and full length axial recesses 86 and 88 respectively. Recesses 86 and 88 are ordered and spaced such that they correspond to the spacing of balls 46 whereby the sleeve may be oriented such that both of balls 46 engage either of recesses 86 or 88 in any given orientation.

When the sleeve is oriented so that the balls 46 engage recesses 88, as seen in FIG. 3A, the balls 60 are not forced into their full inward orientation and thus the fastener may be engaged or disengaged therefrom at will, corresponding to the status shown in FIG. 2A. When the sleeve is rotated from the orientation of FIG. 3A to an orientation as illustrated in FIG. 3B when balls 46 are aligned with recesses 86, the balls 60 are forced inwardly to their full inward orientations, since recesses 86 do not extend fully downward. In this orientation, edges 84 of sockets 20 of the fastener cannot clear balls 60 and the fastener is thus fully retained against surface 58 of the base, similarly to the status of the embodiment shown in FIG. 2B.

It is noted that in both embodiments of the invention, ring 62 prevents disengagement of the sleeve from the base 30.

Figure 5:
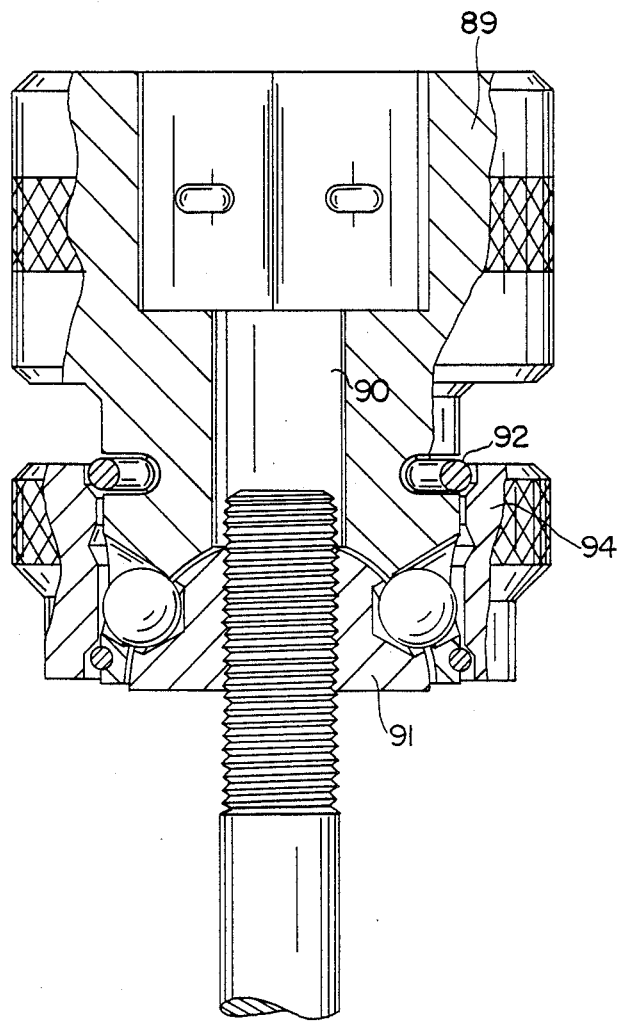
FIG. 5 is a partially cut away illustration of a wrench element constructed and operative in accordance with an alternative embodiment of the invention in engagement association with a nut.

Reference is now made to FIG. 5 which shows a wrench constructed and operative in accordance with an embodiment of the present invention and which is suitable for use with various types of fasteners including both nuts and bolts. The embodiment of FIG. 5 is similar in most relevant respects to the embodiment illustrated in FIGS. 2A and 2B and differs therefrom in that the base, here indicated by reference numeral 89 is provided with an axial bore 90 which is suitable for accommodating the threaded rod portion of a bolt onto which a nut 91 is being fastened.

Figure 7:
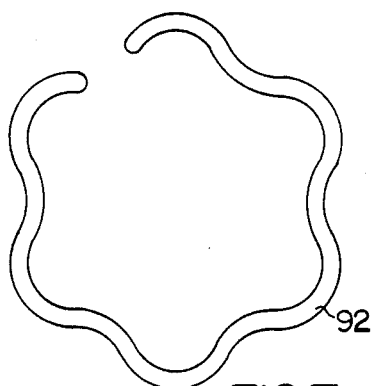
FIG. 7 illustrates a ring used in the embodiment of FIG. 5.

The provision of bore 90 necessitates the elimination of channel 44 and balls 46 and the replacement thereof by a ring 92 which has a tendency to move outwardly. Typically ring 92, (FIG. 7) is made of spring material and is prestressed so as to push radially outwardly into engagement with sleeve 94 for retention thereof in a desired one of its two operating positions. The remainder of the structure of the wrench is similar to that of the wrench illustrated in FIGS. 2A and 2B and its operation is entirely similar.

Figure 6:
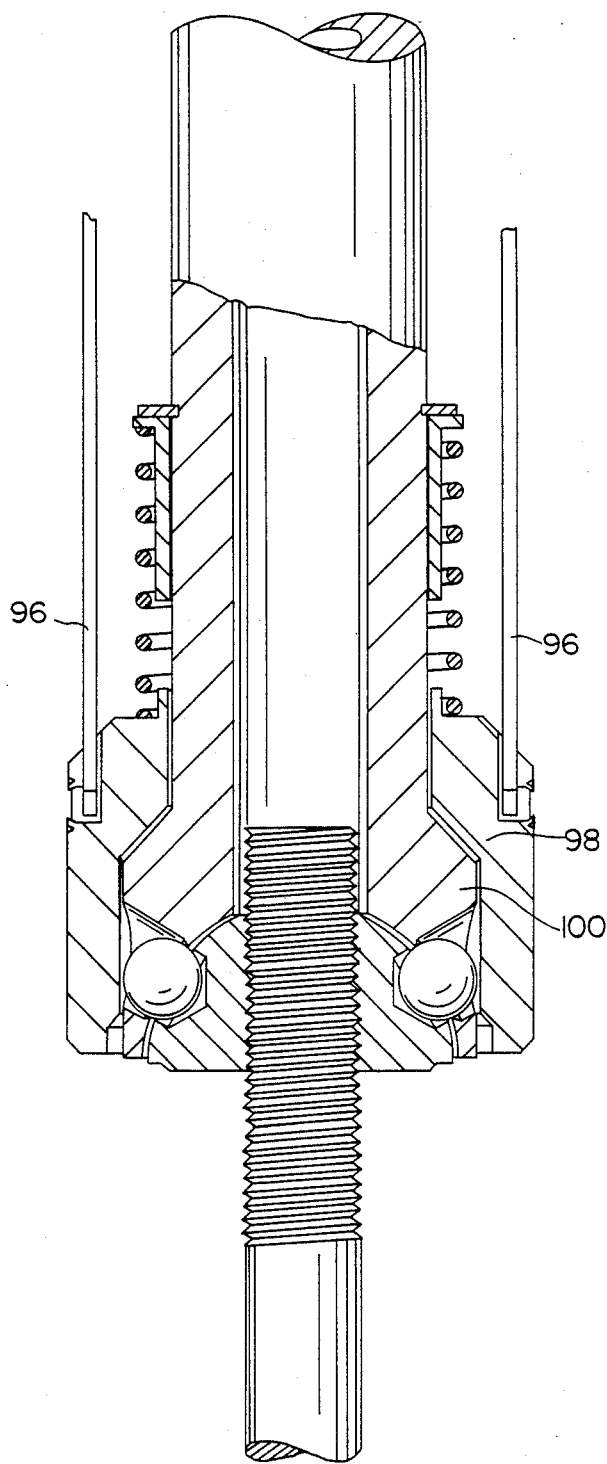
FIG. 6 is a sectional illustration of a wrench element and associated nut constructed for remote access engagement and disengagement.

Reference is now made to FIG. 6 which illustrates a wrench of the type illustrated in FIG. 5 with an additional feature, the provision of elongate actuation rods 96, for providing desired axial motion of the sleeve 98 relative to the base 100. This structure enables engagement and disengagement with a fastener to be provided notwithstanding the unavailability of access of an operator's hand to the location of the fastener. It is appreciated that the elongate actuation rod may be provided also for the embodiment of FIGS. 2A and 2B. It is further appreciated that the embodiment of FIGS. 5 and 6 may be used for both nuts and bolts without requiring any modification. Means may also be provided to permit remote actuation of the apparatus illustrated in FIGS. 3A and 3B.

Reference is now made to FIG. 8 which illustrates an alternative coded type of fastener. In contrast to the fastener illustrated in FIG. 1, wherein all of the sockets are uniformly spaced in a single plane and are all of the same size, in the embodiment of FIG. 8, it is seen that the size of the sockets may vary from socket to socket, the spacing between the sockets may vary between adjacent sockets and the various sockets may lie in different planes.

It is appreciated that a theft resistant coding of fasteners may thus be provided by producing fasteners having a socket configuration to open the fastener. It is appreciated that one or more of the parameters, such as socket size, spacing and plane orientation may be varied. Other parameters, such as socket configuration, may also be varied as required.

Figure 9A:
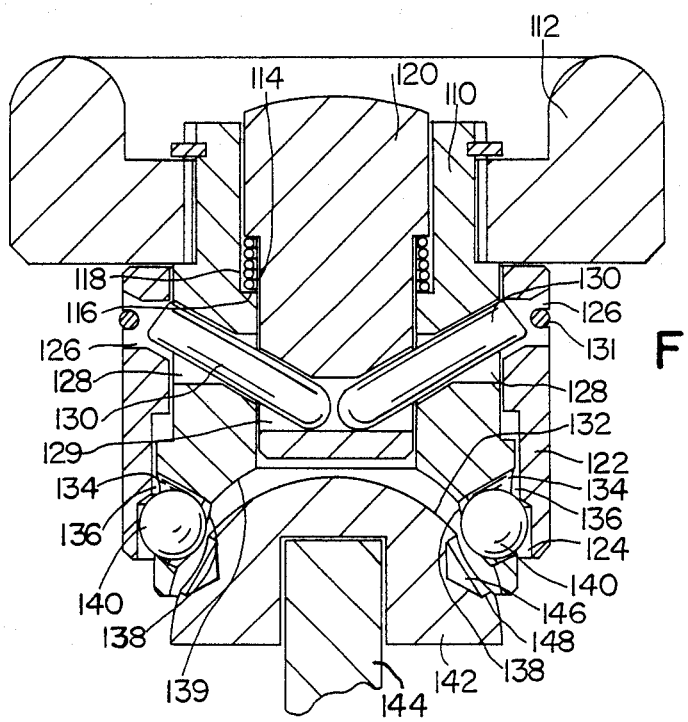
FIGS. 9A and 9B are illustrations, in partially cut away form, of a wrench element with an integrally formed operating handle and associated fastener constructed and operative in accordance with another preferred embodiment of the invention in respective disengaged and engaged orientations.
Figure 9B:
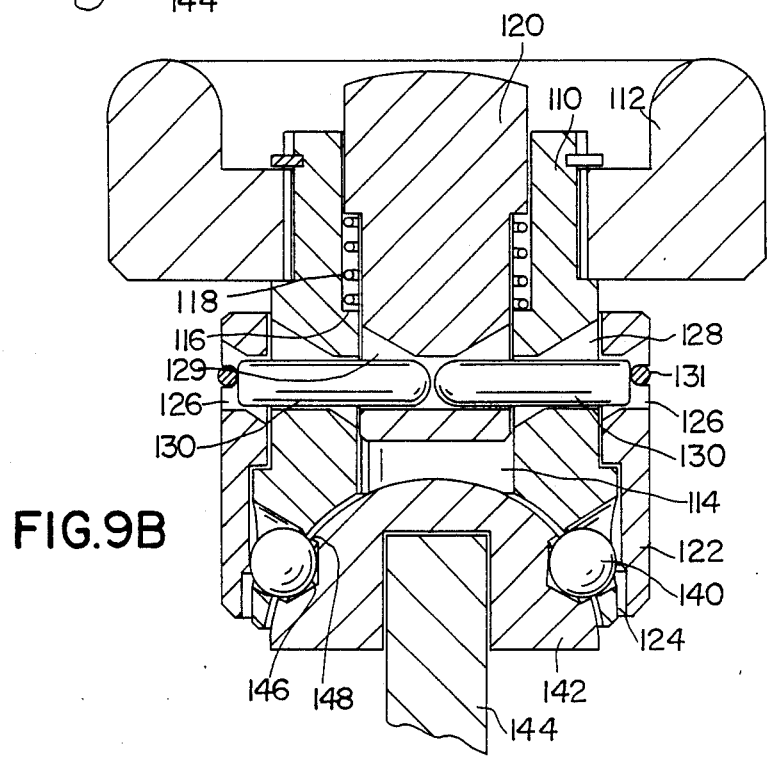

Reference is now made to FIGS. 9A and 9B which illustrate a wrench element with an integrally formed operating handle constructed and operative in accordance with an embodiment of the present invention. The wrench element comprises a base 110 which defines a hand grip 112 at a first butt end surface thereof and a bore 114. Bore 114 defines a shoulder portion 116 upon which sits spiral spring 118. Slideably mounted within bore 114 in engagement with spring 118 is a reciprocatable displacement member 120.

There is provided about base 110 an axially slideable sleeve 122 formed with an edge shoulder recess 124. Seated in channels 126 in sleeve 122 and protruding through channels 128 in base 110 into transverse channel 129 in displacement member 120 are two levers 130. Levers 130 are retained within channels 126 by a circular ring 131.

Base 110 defines at the second end surface thereof a socket defining portion 132 having formed therein a plurality of sockets 134, each defined by a first, large aperture 136 on the radially outer surface of portion 132 and a second smaller aperture 138 on an inner facing surface 139 of portion 132. A ball 140 is disposed in each of the sockets and is sized such as to be able to enter through aperture 136 but as to be prevented from passing through aperture 138.

The operation of the embodiment of FIGS. 9A and 9B will now be described briefly. As seen in FIG. 9A, when displacement member 120 is depressed, levers 130 pivot about their respective pivot locations causing sleeve 122 to slide axially to its retracted orientation. In this orientation balls 140 are partially seated in shoulder recess 124 and thus are not pressed to their full inward position. As a result of the freedom of balls 140 in sockets 134, an engagement element, such as the head portion 142 of a fastener 144, having a plurality of sockets 146 may be readily engaged and disengaged from the base 110, since edges 148 of sockets 146 can clear the balls 140.

Turning now to FIG. 9B, which illustrates the engaged orientation of the wrench element, it is seen that displacement member 120 had been returned to its nondepressed orientation by the action of spring 118. This causes levers 130 to pivot about their respective pivot locations causing sleeve 122 to slide axially relative to base 110 into an extended orientation. In this orientation, sleeve 122 engages balls 140 upwardly of recess 124 and thus forces balls 140 into their full inward position in sockets 146. When the balls 140 are in this position, it can be seen that edges 148 of sockets 146 cannot clear the balls and thus the head portion of the engagement element is securely retained against surface 139.

Figure 10B:
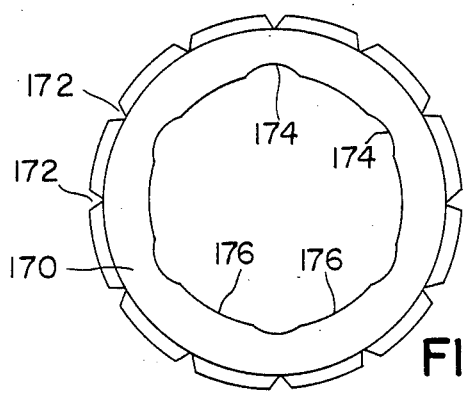
FIG. 10B is the collar of the operating handle of FIG. 10A.
Figure 10A:
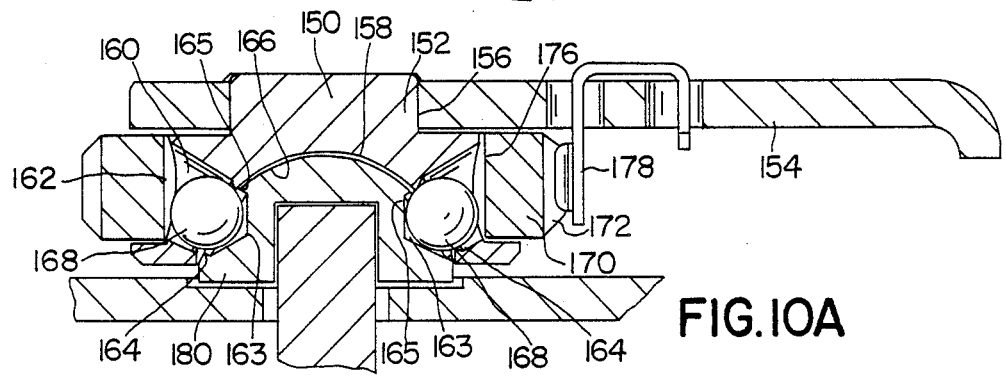
FIG. 10A is a side view illustration, in partially cut away form, of an operating handle and associated fastener constructed and operative in accordance with another preferred embodiment of the invention, in an engaged orientation.
Figure 10C:
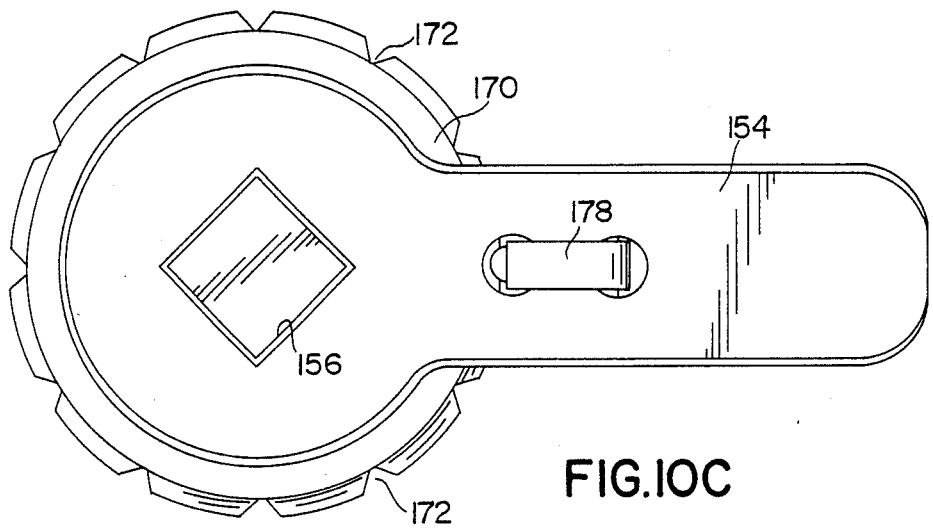
FIG. 10C is a top view illustration of the operating handle of FIG. 10A.

Reference is now made to FIGS. 10A, 10B and 10C which illustrate an alternate embodiment of the wrench element of the present invention having a complementary operating handle. The wrench element comprises a base 150 having a first butt end surface which defines a engagement portion 152 for engagement by the handle 154. In the illustrated embodiment, engagement portion 152 is rectangular in cross section as is the complementary recess 156 in handle 154. However, it is appreciated that any shape permitting secure grasping of engagement portion 152 without relative rotation between the base 150 and the handle 154 may be utilized.

Base 150 defines at the second end surface thereof a socket defining portion 158 having formed therein a plurality of sockets 160, each defined by a first, large aperture 162 on the radially outer surface of portion 158 and a second smaller aperture 164 on an inner facing surface 166 of portion 158. A ball 168 is disposed in each of the sockets and is sized such as to be able to enter through aperture 162 but as to be prevented from passing through aperture 164.

Rotatably mounted about socket defining portion 158 of base 150 is a collar 170 defining on its outer surface a plurality of indentations 172 and on its inner surface a plurality of sockets 174 located opposite alternate indentations 172. Opposite remaining indentations 172, the inner surface defines a smooth face 176.

Handle portion 154 is provided with an indentation engaging member such as spring 178 adapted to selectably engage indentations 172 on collar 170.

The operation of the apparatus of FIGS. 10A-C is as follows. With reference to FIG. 10A, the wrench element is seen in the engaged orientation. Handle 154 is affixed to engagement portion 152 of base 150. A spring 178 engages an indentation 172 of collar 170. In this orientation, collar 170 engages balls 168 at an inner smooth face 176 and thus forces balls 168 into their full inward position in sockets 163 on an engagement element 180. When the balls are in this position, it can be seen that edges 165 of sockets 163 cannot clear the balls and thus the engagement element is securely retained against surface 166.

In order to disengage the wrench element of FIG. 10A, collar 170 is manually rotated in either direction until spring 178 engages the adjacent indentation 172. Balls 168 are now partially seated in sockets 174 in collar 170 and thus are not pressed to their full inward position in sockets 163. As a result of the freedom of movement of balls 168, the wrench element may be readily engaged and disengaged from engagement element 180.

In certain circumstances, it is desirable to remove the wrench element from the engagement element so as to prevent tampering. It is a particular feature of all embodiments of the present invention, including that of FIGS. 10A-C, that removing the wrench element from the engagement element renders it extremely difficult to rotate the engagement element until the wrench element is replaced. Thus, any wrench element of the present invention can be effectively employed, for example, as a door lock wherein the door handle itself is removable.

In other situations, such as instruments including electrical switches, hydraulic valves, regulators and couplings of various sorts, there are shafts arranged for axial rotation which it is desired to preset and render tamperproof. Accordingly, there is provided in accordance with another preferred embodiment of the invention, a removable cap member having a plurality of sockets formed therein which is adapted to be engaged or disengaged by any wrench element constructed and operative in accordance with the present invention.

With reference to FIGS. 11A to D there is seen such a cap member, generally designated 200. FIG. 11B is a side view illustration of the cap member and FIG. 11C is a bottom view illustration thereof. According to a preferred embodiment of the invention, cap member 200 is of overall semispherical configuration defining a disk surface 202 which lies in a plane extending perpendicular to longitudinal axis 204.

A plurality of sockets 206, in the form of recesses having preferably a circular cross section are arranged in the spherical surface of cap member 200. Preferably, the sockets 206 are evenly distributed on the spherical surface and lie in a plane parallel to the plane of disk surface 202. According to a preferred embodiment of the invention, the centers of the sockets are oriented at an angle of approximately 60 degrees downwards with respect to the longitudinal axis 204.

It is appreciated that any desired number of sockets may be employed. The size of the cap member and of the sockets as well as the shape of the sockets may be selected as appropriate. One preferred alternative provides a coded type of cap member wherein the size of the sockets may vary from socket to socket, the spacing between the sockets may vary between adjacent sockets, and the various sockets may lie in different planes. In this case, a similarly coded wrench element would be required to operate the cap member thus providing a theft and tampering resistant element.

As seen in FIGS. 11A and 11C, cap member 200 is further provided with a recess 208 of suitable shape and size to accept the desired shaft 210 to be rotated. In the illustrated embodiment, shaft 210 has a square cross section as does recess 208. It will be appreciated that a shaft of any desired cross section may be utilized so long as recess 208 is complementary.

Cap member 200 may be further provided with two retainer recesses 212 connected to recess 208. Retaining means such as springs 214 are seated in retainer recesses 212 so as to engage shaft 210. Springs 214 may be held in position within retainer recesses 212 as by means of indentations. The retaining springs 214 serve to firmly affix the cap member to the shaft so that the cap member cannot be removed therefrom except by means of the complementary wrench element. To facilitate this retention, shaft 210 may be provided with indentations 216 as shown in FIG. 11A or any other means for engagement by retainer springs 214.

In the case of a round shaft, as illustrated in FIG. 11D, it is necessary to provide means to prevent relative rotation between the cap member and the shaft and to permit the cap member to firmly engage the shaft. To this end, shaft 210 may be provided with protrusions 218 adapted to sit within retainer recesses 212. Protrusions 218 may define indentations 217, as described above, to facilitate engagement by retainer springs 214.

FIG. 11A illustrates cap member 200 in engaged orientation with a shaft 210 arranged for axial rotation within a workpiece 220. Workpiece 220 may be provided with a shallow recess 222 in which disk surface 202 of cap member 200 sits. This aids in preventing unauthorized removal of the cap member. Recess 208 of the cap member slides onto shaft 210, compressing springs 214 until indentations 216 or 217 enter into locking engagement with the springs. The cap member and shaft may now be axially rotated as desired by means of the appropriate wrench element.

It will be appreciated by those skilled in the art that the invention is not limited to what has been sPecifically shown and described hereinabove. Rather, the scope of the invention is defined solely by the claims which follow.

I/We claim:

1. A theft-resistant fastener system including a rotatable wrench adapted to engage a head portion of a fastener and to rotate said fastener and head portion about a fastener axis, said fastener system made by the method comprising in combination the steps of:
   providing said wrench and fastener jointly with at least three ball-and-socket joints distributed about said axis, including providing each of said ball-and-socket joints with a ball in said wrench and a socket in said head portion of the fastener, each socket being provided with a circular cross-section about a socket axis extending at an acute angle to said fastener axis;
   providing said wrench with a releasable actuator for pressing said balls into said sockets preparatory to and during rotation of said wrench about said fastener axis;
   preventing said head portion from clearing, said balls, when said actuator presses said balls into said sockets, by providing said head portion at each socket with an overhang extending over part of the ball in that socket;
   avoiding a need for means for biasing the balls out of the sockets upon release of said actuator by providing each overhang with an outer limit closer to said fastener axis than a center of a corresponding one of the balls of said ball-and-socket joints; and
   preventing actuation of said fastener by a conventional wrench by providing said head portion with a sloped outer surface at the sockets about said fastener axis.

2. A system as claimed in claim 1, wherein:
   said acute angle substantially is 60° relative to said fastener axis.

3. A system as claimed in claim 1, wherein said method includes the step of:
   restricting removal of said fastener to a specifically authorized wrench by distributing said ball-and-socket joints irregularly about said fastener axis.

4. A system as claimed in claim 1, wherein said method includes the step of:
   restricting removal of said fastener to a specifically authorized wrench by varying said sockets in size about said fastener axis.

5. A system as claimed in claim 4, wherein said method includes the step of:
   further restricting removal of said fastener to a specifically authorized wrench by distributing said ball-and-socket joints irregularly about said fastener axis.

6. A system as claimed in claim 5, wherein said method includes the step of:
   further restricting removal of said fastener to a specifically authorized wrench by arranging said sockets in different planes extending perpendicularly to said fastener axis.

7. A system as claimed in claim 1, wherein said method includes the step of:
   restricting removal of said fastener to a specifically authorized wrench by arranging said sockets in different planes extending perpendicularly to said fastener axis.

8. A system as claimed in claim 7, wherein said method includes the step of:
   further restricting removal of said fastener to a specifically authorized wrench by distributing said ball-and-socket joints irregularly about said fastener axis.

9. A system as claimed in claim 7, wherein said method includes the step of:
   further restricting removal of said fastener to a specifically authorized wrench by varying said sockets in size about said fastener axis.

10. A theft-resistant fastener system comprising in combination:
    a fastener with a head portion having a sloped outer surface about a fastener axis;
    a rotatable wrench adapted to engage a head portion of said fastener and to rotate said fastener and head portion about said fastener axis;
    said wrench and fastener jointly comprising at least three ball-and-socket joints distributed about said axis, each of said ball-and-socket joints having a non resiliently biased ball in said wrench and a socket in said sloped outer surface of said head portion of the fastener so as to prevent actuation of said fastener by a conventional wrench, each socket having a circular cross-section about a socket axis extending at an acute angle to said fastener axis;
    said wrench including a releasable actuator means for pressing said balls into said sockets preparatory to and during rotation of said wrench about said fastener axis; and
    said fastener including means for preventing said head portion from clearing said balls, when said wrench presses said balls into said sockets, including in said head portion, at each socket, an overhang extending over part of the ball in that socket, each overhang having an outer limit closer to said fastener axis than a center of a corresponding one of the balls of said ball-and-socket joints.

11. A theft-resistant fastener system as claimed in claim 10, wherein:
    said acute angle substantially is 60° relative to said fastener axis.

12. A theft-resistant fastener system as claimed in claim 10, wherein:
    said ball-and-socket joints have an irregular distribution about said fastener axis.

13. A theft-resistant fastener system as claimed in claim 10; wherein:
    said ball-and-socket joints are of varying size about said fastener axis.

14. A theft-resistant fastener system as claimed in claim 10; wherein:
    said ball-and-socket joints are in different planes extending perpendicularly to said fastener axis.

15. A theft-resistant fastener system as claimed in claim 10, wherein:
    each ball is disposed in a ball retaining socket having a circular cross-section about a ball retaining socket axis extending at an acute angle to said fastener axis.

16. A theft-resistant fastener system as claimed in claim 10, wherein:
    each ball is disposed in a ball retaining socket having a circular cross-section about a ball retaining socket axis extending at an acute angle of substantially 60° relative to said fastener axis.

* * * * *